Figure 1:
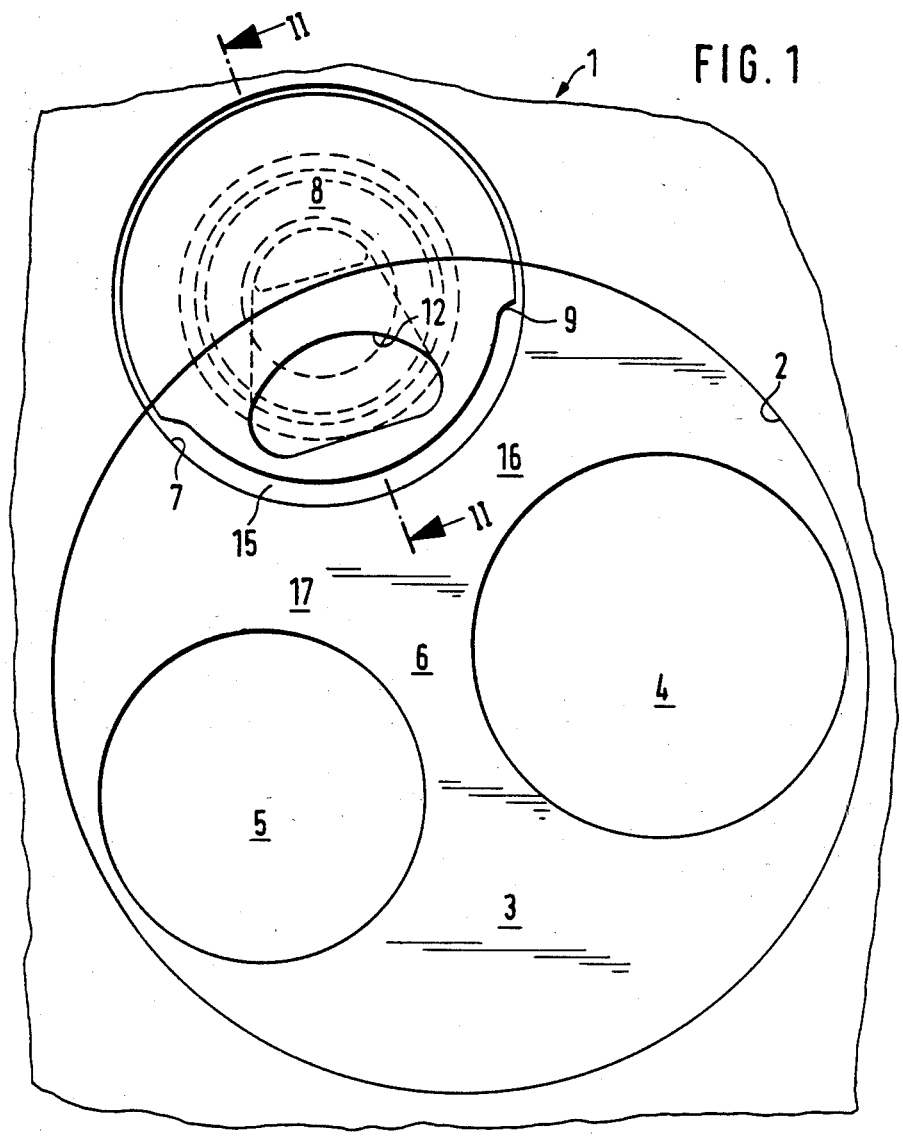

United States Patent [19]

Schausberger

[11] Patent Number: 4,552,108
[45] Date of Patent: Nov. 12, 1985

[54] CYLINDER HEAD OF LIGHT METAL FOR AIR-COMPRESSING, AUTO-IGNITING INTERNAL COMBUSTION ENGINES

[75] Inventor: Christoph Schausberger, Munich, Fed. Rep. of Germany

[73] Assignee: Bayerische Motoren Werke AG, Fed. Rep. of Germany

[21] Appl. No.: 498,809

[22] Filed: May 27, 1983

[30] Foreign Application Priority Data

Jun. 2, 1982 [DE] Fed. Rep. of Germany ....... 3220753

[51] Int. Cl.$^4$ .............................................. F02B 19/00
[52] U.S. Cl. ................................ 123/270; 123/193 H
[58] Field of Search ............... 123/254, 262, 263, 266, 123/270, 271, 273, 193 H, 193 CH

[56] References Cited

U.S. PATENT DOCUMENTS 3,398,726  8/1968  Bricout ................................ 123/254
4,122,805 10/1978  Kingsbury et al. .................. 123/263
4,418,655 12/1983  Henning ........................... 123/193 H

FOREIGN PATENT DOCUMENTS 2537849  3/1977  Fed. Rep. of Germany .

Primary Examiner—Ira S. Lazarus
Assistant Examiner—David A. Okonsky
Attorney, Agent, or Firm—Craig and Burns

[57] ABSTRACT

A cylinder head of light metal for an air-compressing, self-igniting internal combustion engine which is provided with a vortex chamber that is delimited on the side of the main combustion space by an insert of a high heat-resistance material; the insert which preferably has an abutment collar is arranged in a stepped bore in the cylinder head bottom; a relatively high temperature is desired for the insert with the firing channel which is controlled by heat removal in particular into the cylinder head bottom; the abutment collar and the insert are spaced each exclusively within a section of the outer circumference facing a hot zone of the cylinder head bottom from the respective walls of the stepped bore; the spacing at the insert is smaller than the structural height thereof.

8 Claims, 2 Drawing Figures

CYLINDER HEAD OF LIGHT METAL FOR AIR-COMPRESSING, AUTO-IGNITING INTERNAL COMBUSTION ENGINES

The present invention relates to a cylinder head of light metal for air-compressing self-igniting internal combustion engines of the type described in German Offenlegungsschrift No. 25 37 847.

With self-igniting internal combustion engines of this type of construction, a relatively high temperature is aimed at for the insert and the firing channel between the auxiliary combustion chamber and the main combustion chamber for the mixture preparation as well as for initiation of the ignition process. For this purpose with the known type of construction, on the one hand, the insert is spaced within the area of its vortex chamber section by a relatively wide circumferential groove with respect to the walls of the aperture in the cylinder head bottom and is partially heat-insulated thereby. On the other hand, the insert is in direct contact with the cylinder head bottom within the area of the firing channel for the control of the temperature by heat removal.

A zone of the cylinder head bottom adjacent the orifice of the firing channel becomes relatively hot by the combustion jet deflected at the piston top. A considerable dam-up of heat thus results for the cylinder head bottom in the mutually facing areas of the first hot zone about the insert and the second hot zone by the combustion jet in the bottom layer on the side of the combustion space.

This thermal dam-up leads in the cylinder head bottom to mutually oppositely directed thermal expansions which especially by reason of the temperature differences within the cylinder head bottom may lead to a compression and buckling of the material, i.e., compressive strains thereof. The exceeding of the elastic zone of the light metal used for the cylinder head which occurs therewith brings about a crack formation during the cooling off of the cylinder head bottom.

The present invention is concerned with the task to so construct a cylinder head of the type of construction described hereinabove that, on the one hand, the thermal expansion of the strongly heat-stressed part of the cylinder head bottom is possible without local compressive strains and crack formation and that, on the other hand, the heat removal from the insert delimiting the auxiliary combustion chamber into the well-cooled part of the cylinder head bottom remains preserved without impairment.

The underlying problems are solved according to the present invention in that the insert is spaced at least within the section of its outer surface that faces a relatively hot zone of the cylinder head bottom during operation of the engine. With the present invention, the heat is conducted from the auxiliary combustion chamber-insert intentionally and—if a spacing in the remaining part of the outer surface of the insert is omitted—into a relatively cool area of the cylinder head bottom. At the same time, the possibility of a sufficient expansion is created for the strongly expanding hot zone by reason of the spacing and thus the danger of plastic material compression and buckling as well as crack formation is avoided.

A cylinder head for air-compressing internal combustion engines with direct fuel injection is described in the German Offenlegungsschrift No. 21 02 071 which in the vicinity of a thermally highly stressed section of the cylinder head bottom is provided with a bore within the same which is closed up by a collar plug leaving free expansion joints in the radial direction. Though this arrangement serves for the equalization of longitudinal changes without plastic deformation of the thermally highly stressed section, a closure plug is used in that case which is intensively cooled by the cooling medium of the internal combustion engine. Thus, this patent contains no suggestion to so further develop a light metal cylinder head with an auxilliary combustion chamber insert consisting of iron material that, notwithstanding the necessary high temperature thereof, the thermal expansions of an adjacent thermally highly stressed zone cannot be impaired.

The spacing according to the present invention may be realized both along the outer circumference of the insert as also at the inner circumference of the aperture in the cylinder head bottom. According to a particularly favorable construction, the insert is provided with an abutment collar whereby the abutment collar and insert are spaced each along about half the outer circumference thereof from the respective walls of stepped bores whereby the spacing at the insert is delimited by a conical surface which has an increasing radius starting from the edge between the abutment collar and the insert in the direction toward the outer circumference of the insert.

Figure 2:
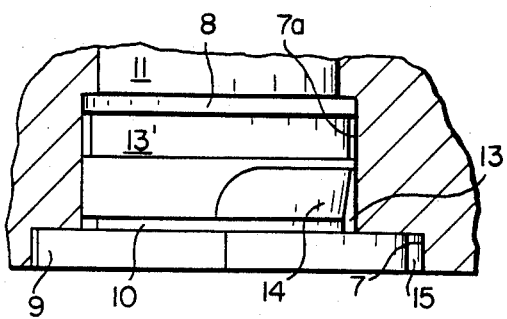

These and other objects, features and advantages of the present invention will become more apparent from the following description when taken in connection with the accompanying drawing which shows, for purposes of illustration only, one embodiment in accordance with the present invention, and wherein:

FIG. 1 is a partial view of a cylinder head for a diesel internal combustion engine in accordance with the present invention; and FIG. 2 is a partial cross-sectional view through the cylinder head bottom within the area of the vortex chamber insert taken along line II—II of FIG. 1.

Referring now to the drawing wherein like reference numerals are used throughout the two views to designate like parts, a cylinder head generally designated by reference numeral 1 of light metal, not illustrated in detail, covers off a cylinder bore 2 of a diesel internal combustion engine. An inlet 4 and exhaust 5 are coordinated to each cylinder bore 2 within the cylinder head bottom 3. A web 6 of the cylinder head bottom 3 extends between the inlet 4 and the exhaust 5. An insert 8 with an abutment collar or flange 9 is arranged in a stepped bore 7, 7a (FIG. 2) in the longitudinal direction of the web 6 near the cylinder bore 2. The abutment collar 9 is offset from the insert 8 by a circumferential annular groove 10. The insert 8 is of a high heat-resistance material for example an iron material and delimits a vortex chamber 11 on the side the main combustion chamber. A firing channel 12 in the insert 8 is directed in the direction toward the web 6.

On the side facing the web 6 which is relatively hot in operation, the abutment collar 9 and the insert 8 are each spaced approximately over half the outer circumference from the walls of the stepped bore 7, respectively, 7a by means of an air gap (13). The spacing 13 at the insert 8 is delimited by a conical surface of rotation 14 rising from the bottom of the annular groove 10 toward the cylindrical outer circumference of the insert 8. The spacing extends over a lesser height than the structural height of the insert 8.

By reason of the exclusively local spacing 13 and 15 at the insert 8, respectively, at the abutment collar 9, facing the web 6, the heat is removed without impairment from the insert 8 into a relatively cool area of the cylinder head bottom 3 opposite the hot web 6. The spacings 13 and 15 are so dimensioned that the web 6 heated by the combustion jet, in particular its bottom layer on the side of the combustion space, may freely expand toward the abutment collar 9 as well as toward the insert 8. Compressions and bucklings of the cylinder head material by impairment of the thermal expansion and crack formations during the cooling off are substantially precluded in this manner. A matching of the magnitude of the spacings 13 and 15 therebeyond enables an adjustment of the temperature of the insert 8 to its function as wall part of the vortex chamer 11and as firing channel 12. For that purpose, an annularly shaped spacing 13' of the insert 8 may additionaly be provided.

Relatively hot zones are additionally the webs 16 and 17 between the insert 8 and the inlet 4, respectively, the exhaust 5, which are disposed laterally to the combustion jet. In the illustrated embodiment, the spacings 13 and 15 at the insert 8 and at the abutment collar 9 extend in each case over all hot zones. However, a separate spacing may also be coordinated to a hot zone.

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A cylinder head of light metal for diesel internal combustion engines, comprising an auxiliary combustion chamber delimited on a side toward a main combustion chamber by an insert means made of a highly heat-resistant material, said insert means being disposed in a stepped bore disposed in the bottom of the cylinder head with a snug fit over a first portion of its outer surface, a second portion of the outer surface of the insert means defining along with a wall of the stepped bore an air gap which extends part way around the circumference of the insert, the air gap facing a zone in the cylinder head bottom which is hot when the engine is running and which expands under the influence of heat, exposure of said insert means to said main combustion chamber being generally limited to the area of the second portion which faces the hot zone in the cylinder head which expands under the influence of heat, said insert means being in contact with a relatively cool area of the cylinder head bottom diametrically opposite the second portion in a thermally conducting manner.

2. A cylinder head according to claim 1, wherein the auxiliary combustion chamber means is a vortex chamber.

3. A cylinder head bottom according to claim 1, wherein the stepped bore means for receiving the insert means includes collar means, the abutment collar means and the insert means being spaced each along about half the outer circumference thereof from the respective walls of the stepped bore means, and the spacing of the insert means being delimited by a conical surface which has a radius which increased starting from the edge between abutment collar means and insert means toward the outer circumference of the insert means.

4. A cylinder head according to claim 3, wherein the auxiliary combustion chamber means is a vortex chamber.

5. A cylinder head of light metal for diesel internal combustion engines, comprising an auxiliary combustion chamber delimited on a side toward a main combustion chamber by a stepped insert means made of a highly heat-resistant material, said stepped insert means being disposed in a stepped bore disposed in the bottom of the cylinder head with a snug fit over a first portion of its outer surface, a second portion of the outer surface of the insert means defining along with a wall of the stepped bore a first air gap, a third portion of the outer surface of the insert means defining along with a wall of the stepped bore a second air gap axially spaced along the stepped insert means relative to said first air gap, at least one of said first air gap and said second air gap extending part way around the circumference of the insert, said first air gap and said second air gap facing a zone in the cylinder head bottom which is hot when the engine is running and which expands under the influence of heat, exposure of said insert means to said main combustion chamber being generally limited to the area of the second portion and the third portion which face the hot zone in the cylinder head.

6. A cylinder head according to claim 5, wherein the auxiliary combustion chamber means is a vortex chamber.

7. A cylinder head bottom according to claim 5, wherein the stepped bore means for receiving the stepped insert means includes collar means, the abutment collar means and the insert means being spaced each along about half the outer circumference thereof from the respective walls of the stepped bore means, and the spacing of the insert means being delimited by a conical surface which has a radius which increased starting from the edge between abutment collar means and insert means toward the outer circumference of the insert means.

8. A cylinder head according to claim 7, wherein the auxiliary combustion chamber means is a vortex chamber.

* * * * *